May 8, 1928.
J. J. GRANT
1,669,003
FLOATING TENSIONAL DEVICE
Filed Dec. 20, 1926   3 Sheets-Sheet 1
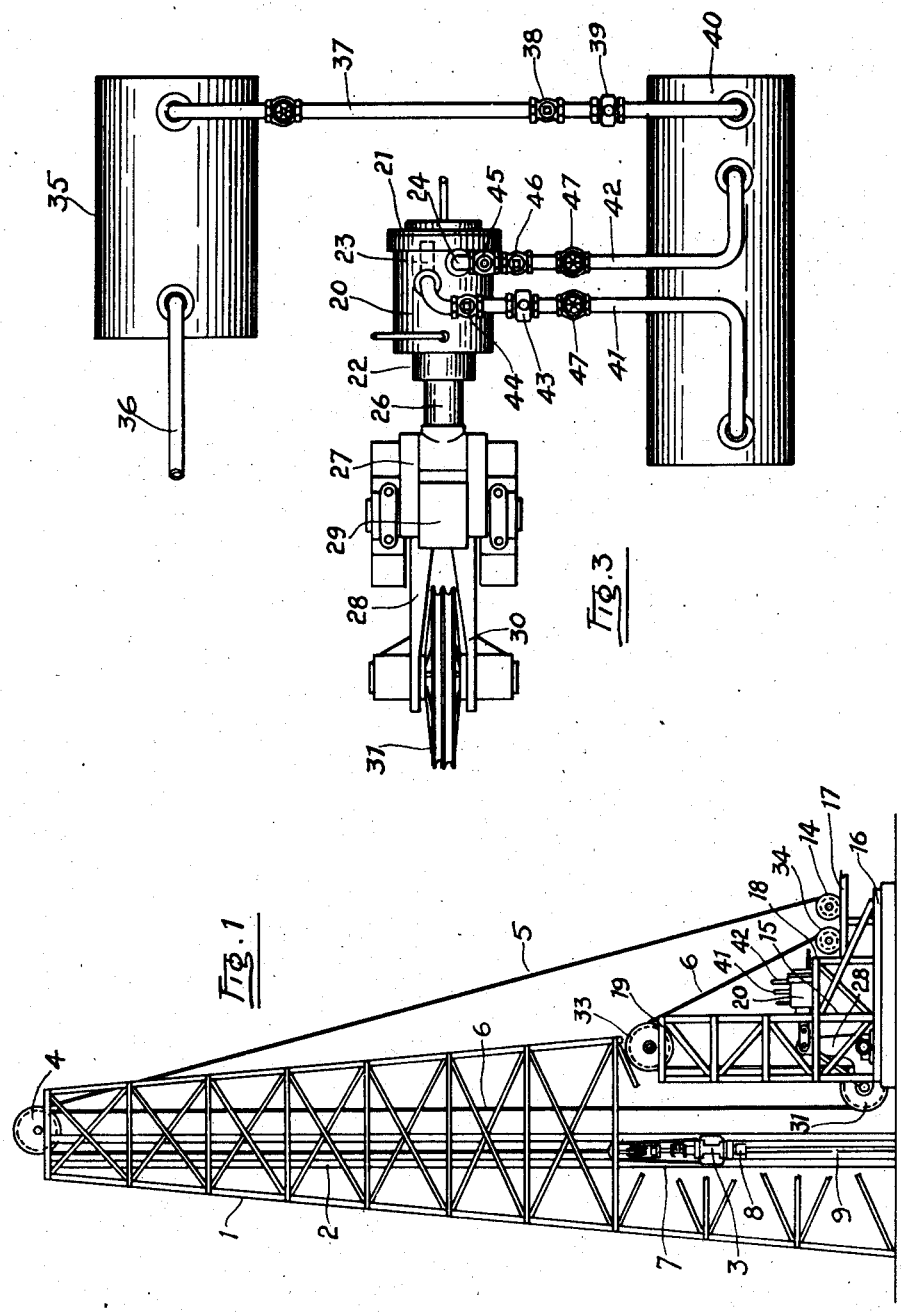
INVENTOR
JOHN JAMES GRANT
BY Fetherstonhaugh & Co
ATTORNEYS

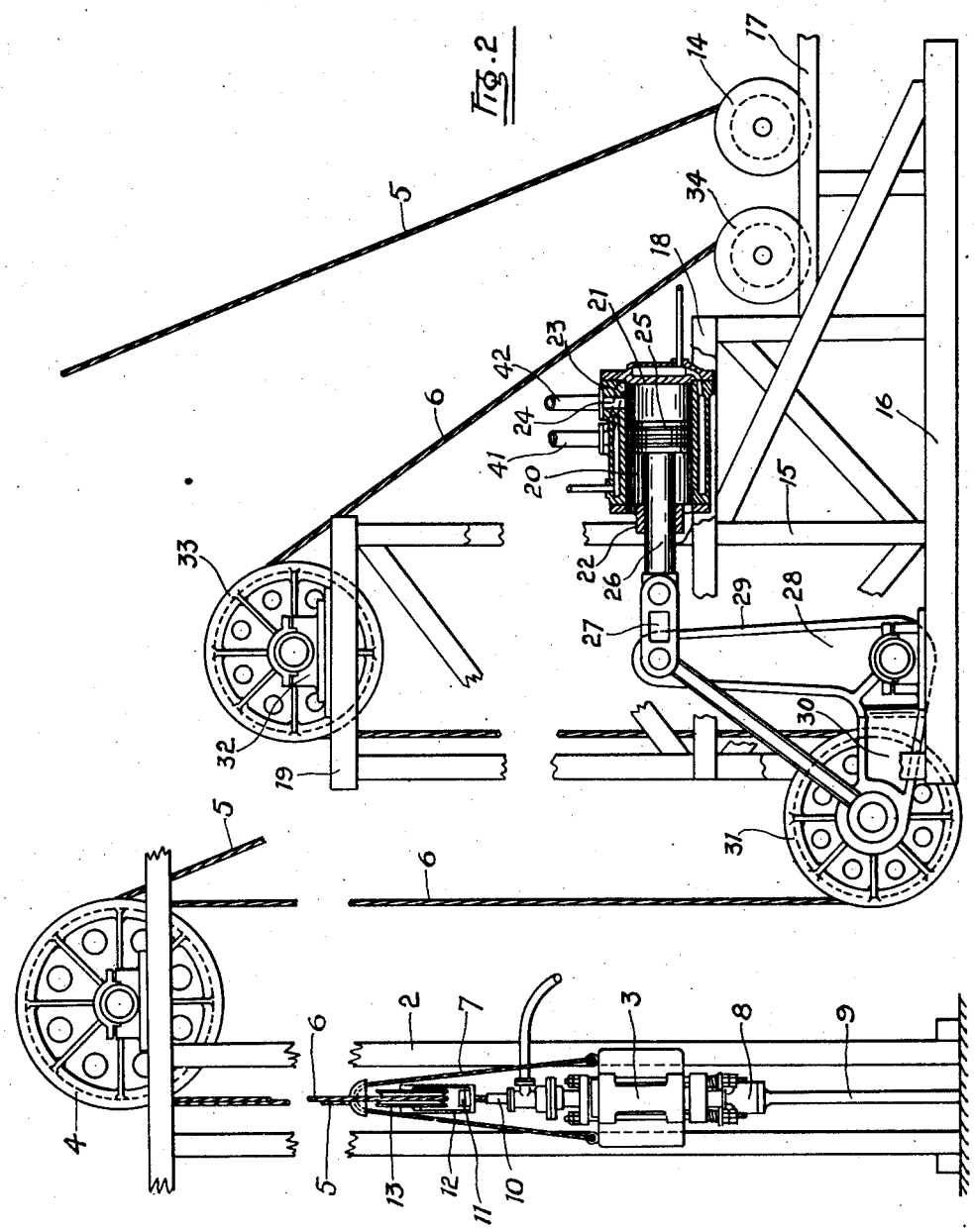

May 8, 1928.
J. J. GRANT
1,669,003
FLOATING TENSIONAL DEVICE
Filed Dec. 20, 1926   3 Sheets-Sheet 3
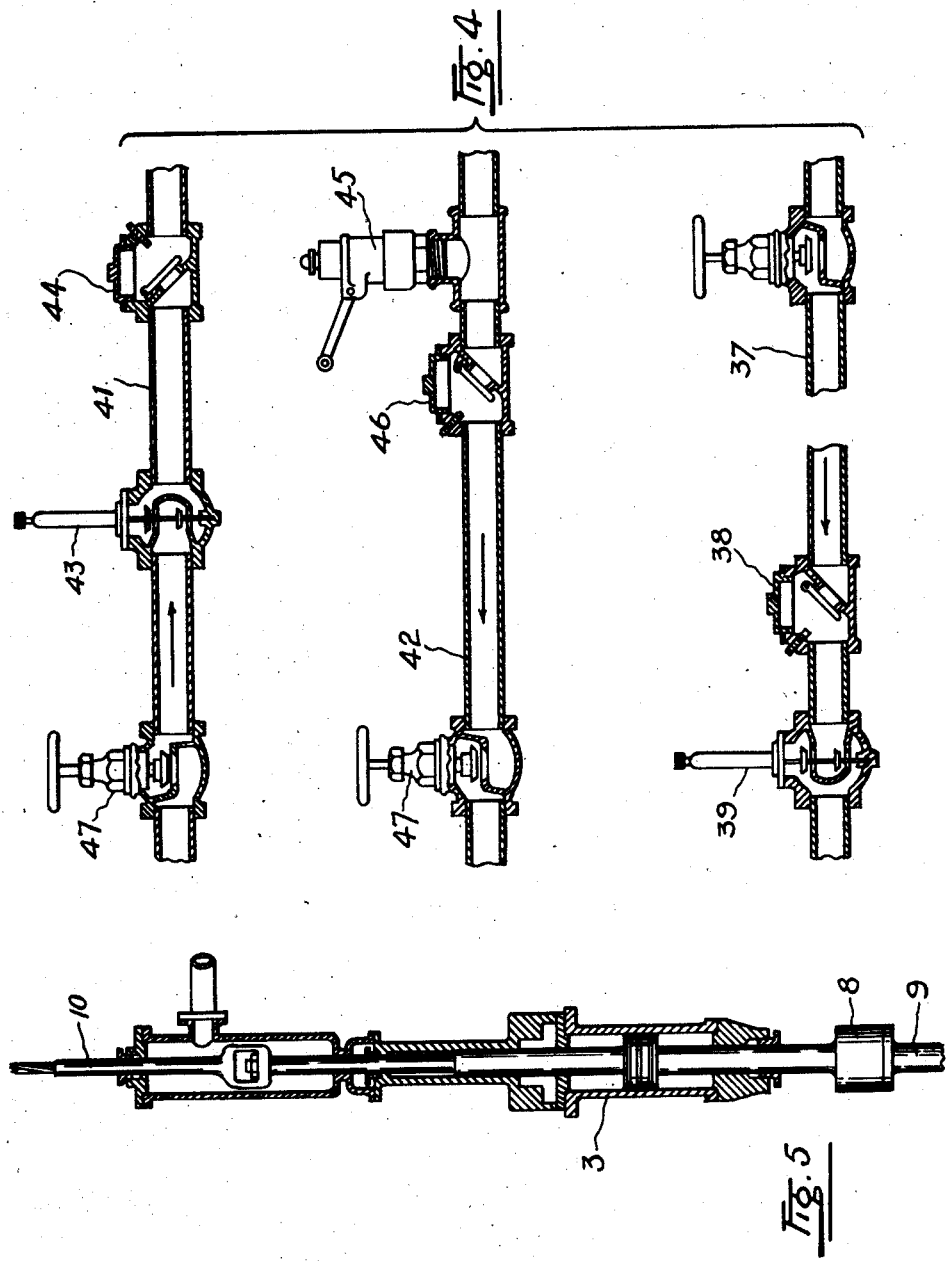
INVENTOR
JOHN JAMES GRANT
BY Fetherstonhaugh & Co
ATTORNEYS Patented May 8, 1928.

1,669,003

UNITED STATES PATENT OFFICE.

JOHN JAMES GRANT, OF VANCOUVER, BRITISH COLUMBIA, CANADA.

FLOATING TENSIONAL DEVICE.

Application filed December 20, 1926. Serial No. 156,014.

My invention relates to improvements in floating tensional devices which are particularly adapted for use in conjunction with reciprocatory drilling machines for deep hole drilling. The particular objects of the invention being to provide a floating tension for sustaining the weight of the drill rods and drill bit while its reciprocation is provided by a suitable drilling machine, also to provide means whereby the sustaining effort may be varied according to the increase of length and consequent weight of such rods; to provide a means whereby the drill may be advanced as the depth of the hole or well increases without interference to the continued operation of the tensioning device; to permit of any length of rod reciprocation within predetermined points and to provide a means whereby the drilling machine is not required to sustain any load, but is only required to move the rod in opposite directions and to impart such power to the drill bit as is required to perform the necessary cutting.

In counter balancing devices in common use, the force of the blow of the drill bit is usually implemented by an unbalanced load of drill rod, which results in the drill bit suffering serious damage, necessitating its frequent removal and repointing with consequent loss of time and increase of operating expense.

The invention consists of a piston within a cylinder resiliently supported on a cushion of air compressed to a pressure equivalent to the weight of the drill rods, means for connecting the rods to the piston, and means for maintaining the pressure within the cylinder substantially constant during the inward or outward stroke of the piston and means for reciprocating the piston, as will be more fully described in the following specification, in which:—

Fig. 1 is general view of the invention fitted to a drilling rig.

Fig. 2 is an enlarged view, part in section, showing its connection with a reciprocating and rotary drilling machine.

Fig. 3 is a plan view of the invention.

Figure 4 is a sectional view of the pipes communicating between the floating tensional cylinder and the pressure supply tanks.

Figure 5 is a sectional view of the drilling machine.

In the drawings like characters of reference indicate corresponding parts in each figure.

The numeral 1 indicates generally a derrick having a pair of guides 2 along which a drilling machine generally indicated by the numeral 3 is vertically movable, and a plurality of head sheaves 4 over which machine cables 5 and rod cables 6 are run. The drilling machine 3 is provided with a supporting bridle 7 by which connection is made to the cable 5. The machine is fitted with an endwise and rotatably movable piston which is fitted with a chuck 8 to which the uppermost of the drill rods 9 is connected, the drill rods being connected together in a continuous length, additional rods being added from time to time as the drilling proceeds in the usual manner. The piston of the drilling machine, not shown, is provided with an upwardly extending piston rod 10 which is provided with a ball thrust or other suitable bearing 11 by which it is connected through a hanger 12 and a sheave 13 to the bight of the rod cables 6, so as to permit the piston and rods 9 to reciprocate and rotate with respect to the drilling machine 3. The outer ends of the machine cables 5 are wound upon a drum 14 of a suitable winding machine, not shown. The parts thus far described are substantially according to general practice and are shown solely for indicating the correlation between the drilling machine and the floating tension to the rods.

The numeral 15 indicates generally a frame having parallel sills 16, a winding drum base 17, a cylinder bed 18 and a sheave frame 19. Mounted upon the bed 18 is an open ended cylinder 20, see Figure 2, having a closure 21 at one end and a piston guide 22 at the other. The cylinder 20 is provided in its side walls with an inlet port 23 shown in dotted line, which enters the cylinder adjacent the closure 21, and an exhaust port 24 leading from the cylinder at an appreciable distance from the end closure. Fitted within the cylinder is a piston 25 having a piston rod 26 extending through the piston guide 22 which is fitted at its outer end with a pivotally connected link 27. Suitably journalled upon the sills 16 is a bell crank 28 having a vertical leg 29 which is connected to the outer end of the link 27 and a forked horizontal leg 30 in which a sheave 31 is journaled. Mounted in bearings 32 upon the sheave frame 19 is a sheave 33, and mounted upon the drum base 17 is the winding drum 14 and a further drum 34. The cables 6 supporting the drill rods 9 after passing over one of the sheaves 4, pass under the sheave 31 of the bell crank 28 then over the sheave 33 and onto the drum 34. The drums 14 and 34 are preferably of the same diameter and are capable of independent or simultaneous operation at the same speed so that the drilling machine 3 and the drill rods 9 may be advanced towards their work simultaneously.

The numeral 35, see Figure 3, indicates a reserve pressure tank having a supply pipe 36 leading from a compressor, not shown, and an outlet pipe 37 which is fitted with a check valve 38 and a reducing valve 39. The outlet pipe 37 leads to a further pressure tank 40 which has a preferred capacity of twenty or more times the capacity of the cylinder 20, the purpose of which will hereinafter be described. The pressure or working tank 40 is provided with suitable gauges and also flow and return pipes indicated by the numerals 41 and 42 respectively, communicating with the cylinder 20 through the inlet port 23 and the exhaust port 24. The flow pipe 41 is fitted with a reducing valve 43 and a check valve 44, which latter serves to prevent a return flow through the pipe. The return pipe 42 is fitted, close to the cylinder, with a blow off valve 45, and close to that with a check valve 46 to prevent a return back to the cylinder. Both flow and return pipes are preferably fitted with shut off valves 47.

Having thus described the several parts of my invention I will now briefly explain its function.

The drilling machine 3 is operated by any suitable pressure and is adapted to be lowered along its guides 2 during the boring of the well and additional lengths of drill rod are added as required, so that the weight to be counterbalanced is subject to great variation. The machine 3 being of considerable weight possesses greater inertia and in consequence will remain substantially stationary during operation when its piston is raising and lowering the drill rods 9. As the weight of the drill rods must necessarily increase in proportion to the depth of the cut, the pressure under which the cylinder 20 will be required to work will vary greatly in order that it may counterbalance the load of the drill rods. Assuming then, that the weight of the drill rods to be counterbalanced requires a working pressure of one hundred pounds per square inch, it will be preferred to maintain a pressure of air in the reserve tank 35 considerably in excess of such required working pressure, and to set the reducing valve 39 to deliver air to the pressure tank 40 at say one hundred pounds pressure or slightly in excess thereof. If the capacity of the cylinder 20 is one twentieth of that of the tank 40, the cylinder 20 with the piston 25 at the outward end of its stroke will contain an air volume of one, and the tank 40 an air volume of twenty, so that when the piston is fully returned into its cylinder, the one volume of air will be added to that of the tank, making a total of twenty one volumes of air therein, or increasing the pressure in the tank to one hundred and five pounds. Now with the reducing valve 43 of the flow pipe 41 set to deliver air from one hundred and five pounds from the tank 40 to the cylinder 20 at one hundred pounds, sufficient force will be applied to the piston 25 to raise the load of the drill rods with the assistance of the drilling machine to overcome the friction on the working parts. On the downward stroke of the drilling machine piston the sheave 31 of the floating tension is raised, driving the piston 25 into its cylinder 20 and forcing the air therein back through the return pipe 42, compressing the one volume of air in the cylinder into the tank 40 which already contains an equivalent of 20 volumes, so that the pressure will be raised thereinto to approximately one hundred and five pounds. As the piston 25 is driven past the exhaust port 24, the air flow through the return pipe 42 is cut off and the remaining air in the cylinder is trapped, causing a cushioning effect which will bring the rods 9 to a state of rest without undue shock, thus preventing damage both to the drill bit and the rods. The return stroke of the piston 25 will, as above described, increase the pressure in the tank 40 over that permitted to pass through the reducing valve 39 of the supply pipe 36, but its return through said valve is prevented by the check valve 38. It will therefore be seen that the rods 9 are driven downwards by the drilling machine 3 against a gradually increasing pressure in the cylinder 20 and the tank 40, and that the cushion provided by the closing by the piston 25 of the exhaust port 24, will produce a quick recoil for overcoming inertia and for starting the rods 9 on their upward travel.

The introduction of the reducing valve 43 in the flow pipe 41 of the tank 40, enables the said tank to be of relatively small size, and results in economy of installation, but if a large tank is available, or one of such size that the compressing of the cylinder contents thereinto will not materially effect the pressure in the tank, the reducing valve 43 may be dispensed with.

When operating the drilling machine, the cables 5 and 6 will be unwound from the drums 14 and 34 simultaneously and at the speed at which the drilling is effected. As the machine reaches its lowest workable position it is disconnected from the rods 9 and raised to the top of the derrick where it is connected to such rods as have been added to those already sunk in the well, when the operation is continued as before.

It will thus be seen that I have invented a device which will provide a very flexible tensioning means for the drill rods of a well drilling machine, which will function equally well under widely varying loads and any stroke within predetermined limits, and one which will develop a fluid pressure during the final movement of the down stroke of the rods, to give a speedy return movement thereto so that the effort required to continue said return or upward movement to the rods will be relatively light.

What I claim as my invention is:

1. In a deep well drilling outfit having a drilling machine for imparting reciprocatory motion to the drill rods, a cylinder having a single acting piston operatively connected to the drill rods, a pressure supply tank having a pair of pipes communicating with the cylinder, means for conducting the flow from the tank to the cylinder and vice versa in one direction only through the pipes, and means for maintaining the pressure flow to the cylinder constant throughout the piston stroke.

2. In a deep well drilling outfit having a drilling machine for imparting reciprocatory motion to the drill rods, a cylinder having an end closure, a single acting piston operatively connected to the drill rods, a pressure supply tank having a flow and a return pipe in communication with flow and return ports of the cylinder, said flow port being disposed adjacent the cylinder end closure and said return port being disposed at a distance forward thereof, and means for maintaining the flow in a constant direction through the flow and return pipes.

3. In a deep well drilling outfit having a drilling machine for imparting reciprocatory motion to the drill rods, a cylinder having a single acting piston operatively connected to the drill rods, a pressure supply tank, flow and return pipes communicating between the cylinder and the tank, through which fluid pressure flows as the piston is reciprocated by the drilling machine, means preventing a reverse flow through either of the pipes, and a reducer valve for reducing the pressure in its flow from the tank to the cylinder.

4. In a deep well drilling outfit having head sheaves and a drilling machine for imparting reciprocatory motion to the drill rods, a cable supporting the weight of said rods extending over a head sheave, a fluid pressure cylinder having a piston, a bell crank having a sheave at one end and being connected to the piston at the other, a drum for winding and feeding the cable to withdraw or lower the drill rods into the well hole, said cable leading over the head sheave and around the bell crank sheave and thence to the drum whereby the reciprocatory motion transmitted to the rods by the drilling machine is communicated to the piston of the fluid pressure cylinder.

5. In a deep well drilling outfit including a drilling machine for imparting reciprocatory motion to the drill rods, a cylinder having a single acting piston operatively connected to the drill rods, a pressure supply tank, flow and return pipes communicating between the cylinder and the supply tank and a reserve pressure tank, said reserve pressure tank being adapted to carry a pressure in excess of that in the pressure supply tank, and means communicating between the reserve tank and the pressure supply tank permitting a flow to the supply tank when its self-contained pressure drops below a predetermined amount.

Dated at Vancouver, B. C., this 6th day of December, 1926.

JOHN JAMES GRANT.